United States Patent [19]

Fisher et al.

[11] Patent Number: 6,138,206
[45] Date of Patent: Oct. 24, 2000

[54] DATA REGISTER FOR MULTICYCLE DATA CACHE READ

[75] Inventors: Michael Todd Fisher, Apalachin; Glenn David Gilda, Binghamton, both of N.Y.

[73] Assignee: International Business Machines Corporation, Armonk, N.Y.

[21] Appl. No.: 08/873,962

[22] Filed: Jun. 12, 1997

[51] Int. Cl.$^7$ ................................... G06F 13/14
[52] U.S. Cl. .......................... 711/118; 711/167; 711/154
[58] Field of Search ................................ 711/118, 128, 711/140, 167, 169, 154

[56] References Cited

U.S. PATENT DOCUMENTS

| | | | |
|---|---|---|---|
| 5,228,134 | 7/1993 | MacWilliams et al. | 395/425 |
| 5,287,481 | 2/1994 | Lin | 395/425 |
| 5,392,410 | 2/1995 | Liu | 395/400 |
| 5,392,414 | 2/1995 | Yung | 711/128 |
| 5,414,827 | 5/1995 | Lin | 395/425 |
| 5,418,922 | 5/1995 | Liu | 395/425 |
| 5,450,565 | 9/1995 | Nadir | 395/427 |
| 5,463,759 | 10/1995 | Ghosh et al. | 395/461 |
| 5,488,709 | 1/1996 | Chan | 395/445 |
| 5,822,756 | 10/1998 | Thome et al. | 711/128 |
| 5,845,323 | 12/1998 | Roberts et al. | 711/128 |

FOREIGN PATENT DOCUMENTS

| | | | |
|---|---|---|---|
| 7-93218 | 4/1995 | Japan | G06F 12/08 |
| WO9533238 | 12/1995 | WIPO | G06F 12/08 |

OTHER PUBLICATIONS

Handy, J., "The Cache Memory Book", ISBN0–12–322985–5, (C) 1993, pp. 101–102.

"Pipelined Cache Dedsign for High Reliability", *IBM Technical Disclosure Bulletin*, vol. 37, No. 07, Jul. 1994 pp. 73–79.

"Cache Optimized Structure Supporting Global Object Locks", *IBM Technical Disclosure Bulletin*, vol. 37, No. 06B, Jun. 1994, pp. 11–17.

"Cache Memory Stgructure for Tolerating Faults", *IBM Technical Disclosure Bulletin*, vol. 38, No. 05, May 1995, pp. 589–590.

Seznec, A. "DASC Cache", Proceedings of 1995 1st IEEE Symposium on High Performance Computer Architecture, Jan. 1995, INSPEC, INSM Abstract An 4881204.

Farkas, K.I. et al. "How Useful . . . ", Proceedings First IEEE Symposium on High–Performance Computer Architecture. Feb. 1995. INSPEC abstract AN4881199.

Bost, E. et al. "A 64–bit Supercomputer on a Single Chip", *Electron*, No. 169, pp. 29–32, Jan. 22, 1990; INSPEC abstract AN B90049244.

*Primary Examiner*—John W. Cabeca
*Assistant Examiner*—Christopher S. Chow
*Attorney, Agent, or Firm*—Shelly M. Beckstrand

[57] ABSTRACT

A cache system provides for accessing set associative caches with no increase in critical path delay, for reducing the latency penalty for cache accesses and for responding to slot MRU misses and cache misses. An N-way set associative cache is provided, each set of said cache including an SRAM array macro having a memory element, an internal SRAM data register, and a read enable signal line. Read enable is generated as the NOR of slot miss and cache miss signals, and the internal SRAM data register is responsive to the slot miss signal for registering data output during a first cycle for use in a next following cycle.

9 Claims, 15 Drawing Sheets

| CYCLE N | CYCLE N+1 | CYCLE N+2 | CYCLE N+3 |
|---|---|---|---|
| INSTRUCTION DECODE | CACHE ACCESS (WRONG MRU GUESS) | CORRECT DATA DELIVERED | |

LOAD INSTRUCTION WITH INCORRECT MRU SLOT GUESS

FIG. 8

| CYCLE N | CYCLE N+1 | CYCLE N+2 | CYCLE N+3 |
|---|---|---|---|
| INSTRUCTION DECODE | CACHE ACCESS (CHACHE MISS, REPLACE MODIFIED LINE) | HOLD DATA LATCHED AT END OF CACHE ACCESS CYCLE | MOVE SAVED DATA INTO CASTOUT BUFFER; READ NEXT DATA FROM CACHE |

LOAD INSTRUCTION REQUIRING CASTOUT OPERATION

FIG. 9

| FIG. 10A | FIG. 10B |

FIG. 10

DATA REGISTER FOR MULTICYCLE DATA CACHE READ

CROSS-REFERENCE TO RELATED APPLICATIONS

U.S. patent applications Ser. No. 08/873,783, filed Jun. 12, 1997, (now U.S. Pat. No. 5,940,877), entitled "Cache Address Generation"; Ser. No. 08/873,785, filed Jun. 12, 1997, entitled "Multiway Associative External Microprocessor Cache", now U.S. Pat. No. 5,909,694; and Ser. No. 08/873,991 (pending), filed Jun. 12, 1997, entitled "Pipelined Snooping of Multiple L1 Data Cache Lines", filed concurrently are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention generally relates to set associative caches for computer systems, and more particularly to responding to MRU misses and cache misses.

2. Background Art

The use of caches for performance improvements in computing systems is well known and extensively used. See, for example, U.S. Pat. No. 5,418,922 by L. Liu for "History Table for Set Prediction for Accessing a Set Associative Cache", and U.S. Pat. No. 5,392,410 by L. Liu for "History Table for Prediction of Virtual Address Translation for Cache Access", the teachings of both of which are incorporated herein by reference.

A cache is a high speed buffer which holds recently used memory data. Due to the locality of references nature for programs, most of the access of data may be accomplished in a cache, in which case slower accessing to bulk memory can be avoided.

In typical high performance processor designs, the cache access path forms a critical path. That is, the cycle time of the processor is affected by how fast cache accessing can be carried out.

Referring to FIG. 7, set associative or multi way cache designs are a common approach for implementing high performance access to storage. Read address registers 150, 160 are connected by lines 151, 161, respectively to arrays 152, 162, the outputs of which appear on lines 153, 163. Typically, an N-way cache has N arrays 152, 162 which are accessed in parallel along with N directory address entries which determine which array has the data of interest via address compare logic. Each of arrays 152, 162 comprises one or more array macros, the number of such macros included in each array 152, 162 being sufficient to provide the desired number of data bits.

Referring to FIG. 8, determination of which array has the data of interest occurs late in the same cycle as the access of the multiple cache data arrays 152, 162. This determination is often late enough that it is not useful to gate correct data in the same cycle. A useful alternative is to guess at which array contains the correct data and gate its output accordingly. An MRU array is commonly employed to perform this function. It is referred to here as a "slot" MRU array, the term "slot" representing one of the four sets of a four way set associative cache. The correctness of the guess is determined by comparing it with the true indication from the address compares during cycle N+1 181. If the guess is wrong, a stall cycle occurs, and the correct array data is sent in the following cycle N+2 182. This correct cache array data must be available in the following cycle 182 in order to limit the stall penalty for an incorrect guess to one cycle.

Referring again to FIG. 7, traditionally one of the following two alternatives is employed to make the correct cache array data available in the cycle following a wrong MRU guess. The first is to provide a hold signal to the read address registers 150, 160 of the cache arrays 152, 162, respectively, which hold signal is activated directly by comparing a guessed address with a true address. The second is to latch all cache array outputs 153, 163 at the end of the access cycle n+1 181 in data out registers 154, 164, respectively, and gate the appropriate register 154, 164 in the following cycle n+2 182.

The first implementation creates a critical path problem which limits the processor cycle time. The second implementation alleviates the critical path problem but at the expense of significant additional circuitry for the data registers 154, 164 and associated multiplexing. For instance, in a 4-way cache with a 16-byte data flow, it would add 432 latches to hold the data and paity in excess of the 144 latches needed to hold a selected output.

A similar problem exists with certain store-in or write-back cache designs. A store-in cache requires moving modified data out of the cache and storing it to another level of cache or main memory when the cache line replacement algorithm chooses a modified cache line for replacement (a cache line is a block of data that is tansferred as a unit between different levels of a cache or memory.) Typically, the movement of modified data out of cache (called a castout operation) is overlapped with the request of the new line (called a fill operation) from a lower level of the cache/memory subsystem. The castout operation should occur as quickly as possible so that as little interference as possible occurs with the delivery of new data for the fill.

Referring to FIG. 9, one means of minimizing the number of cycles to complete the castout is to save the data read during the original cache access cycle n+2 192. Another means is to hold the address registers in cycle 191 using a late indication of a cache miss requiring a castout. These solutions are subject to the same limitations described for the slot MRU wrong guess alternative.

A similar problem exists when a cache miss occurs and the slot that needs to be replaced has modified data and must be castout (or copied back) from the cache. The least recently used (LRU) slot is selected for the castout, but the most recently used (MRU) slot was used in the initial access of cache. Therefore the data selected in the initial access is not the correct data to store into the copy back data register (also referred to as the unaligned data register.)

Consequently, it is an object of the invention to provide a system for recovering from a slot MRU miss that avoids the need to reaccess the cache and that does not require the use of additional data out registers external to the array macro.

It is a further object of the invention to provide a system for completing a castout operation that avoids the need to reaccess the cache and that does not require the use of additional data out registers external to the array macro.

SUMMARY OF THE INVENTION

In accordance with the invention, an apparatus and method is provided for reading an N-way set associative cache, each set of said cache including an SRAM array macro having a memory element, an internal SRAM data register, and a read enable signal line. Read enable is generated as the NOR of slot MRU miss and cache miss signals, and the SRAM data register is responsive to the read enable signal for holding data output from a first cycle for use in a next following cycle.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4, the system bus controls; FIG. 5, the L2 cache data bus; and FIG. 6, the L2 cache controls.

FIG. 8 is a diagrammatic representation of the processing of a cache load instruction with incorrect MRU slot guess.

FIG. 9 is a diagrammatic representation of the processing of a cache load instruction requiring a castout operation.

BEST MODE FOR CARRYING OUT THE INVENTION

Part 1

Figure 1:
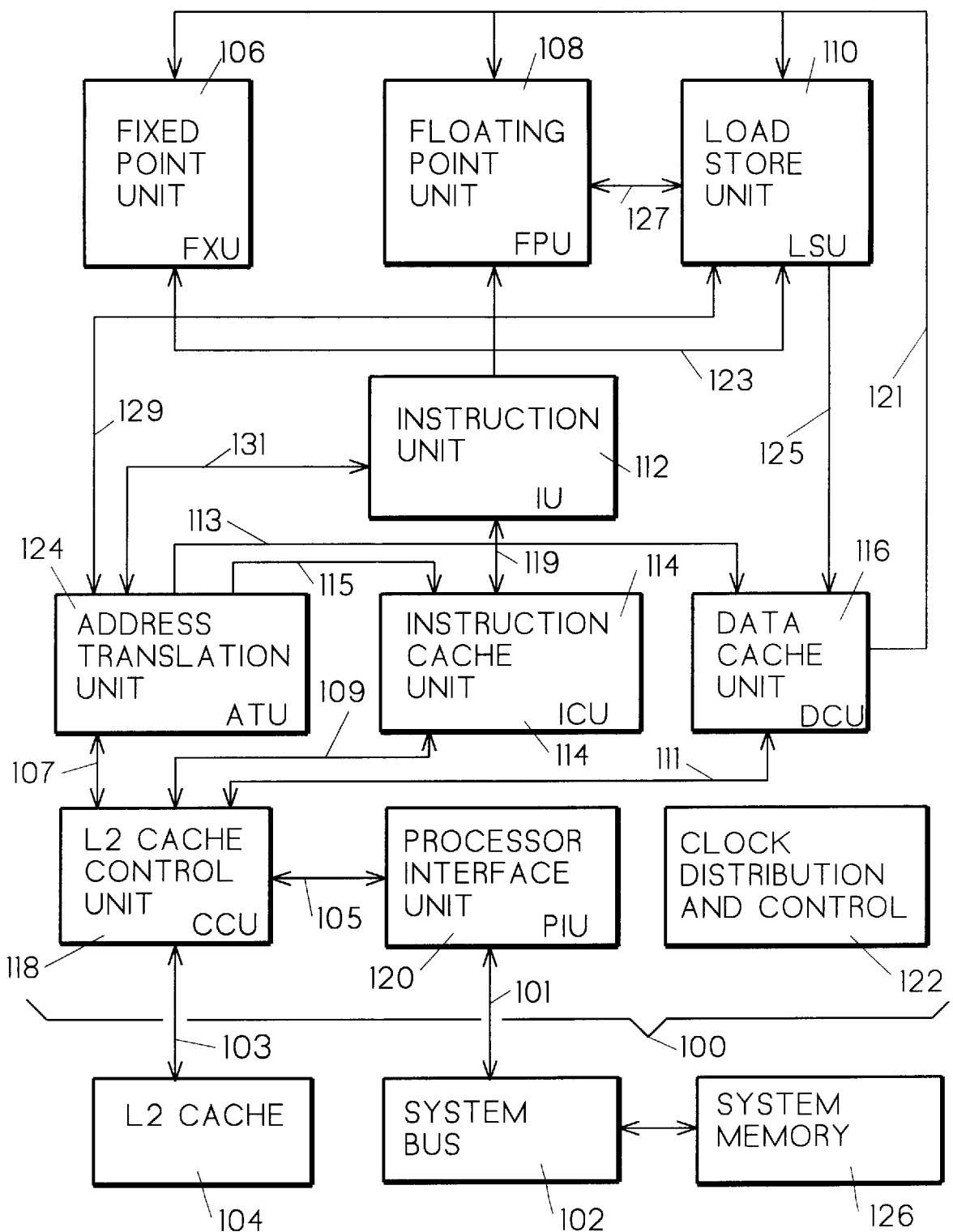
FIG. 1 is a block diagram illustrating a typical microprocessor architecture within which a preferred embodiment of the invention is implemented.

Referring to FIG. 1, the microprocessor architecture within which a preferred embodiment of the invention is implemented will be described.

Microprocessor chip 100 is organized to interface system bus 102 and L2 cache 104, and includes the following functional units: fixed point unit (FXU) 106, floating point unit (FPU) 108, load store unit (LSU) 110 , instruction unit (IU) 112, instruction cache unit (ICU) 114, data cache unit (DCU) 116, L2 cache control unit 118, processor interface unit (PIU) 120, clock distribution and control 122, and address translation unit (ATU) 124. In a multi processor environment, several processors 100 and their associated L2 caches 104 may interface system bus 102 over buses equivalent to bus 101, and share access through system bus 102 bus to main memory (sometimes referred to as L3 memory) 126.

The various functional units of microprocessor 100 interface over data, address, and/or control I/O pins, lines and/or busses as will be described hereafter. When referring to a figure, "line" can refer to either a single signal line or a collection of signal lines (i.e., a bus). Those functional units most pertinent to the invention, and which will be described in greater detail hereafter, include the load/store unit (LSU) 110, the data cache unit (DCU) 116, the L2 cache control unit (CCU) 118, and the address translation unit (ATU) 124.

In broad overview, the functional units on chip 100 communicate as follows. Clock distribution and control 122 provides clocking signals to all functional units on microprocessor chip 100. System bus 102 interfaces to PIU 120 over bidirectional bus 101, and thence over buses 105 with CCU 118. L2 cache 104 communicates with CCU 118 over buses 103. CCU 118 communicates instructions with ICU 114 over buses 109, with DCU 116 over buses 111, and provides address information to ATU 124 and receives miss interface signals over buses 107. LSU110 and IU 112 provide request interfaces to ATU 124 and receive translation state information over lines 129 and 131. ATU 124 provides translated address to ICU 114 over lines 115, and to DCU 116 over lines 113. ICU 114 interfaces to instruction unit 112 over bus 119. DCU 116 provides data to FXU 106, FPU 108 and LSU 110 over bus 121, and IU 112 provides instructions to FXU 106, FPU 108 and LSU 110 over bus 123. LSU 110 provides data to DCU 116 over bus 125. FPU 108 provides and receives data to DCU 116 over buses 127 to LSU 110, then across buses 125. Processor 100 accesses main memory through system bus 102.

Microprocessor Core 100

Figure 2:
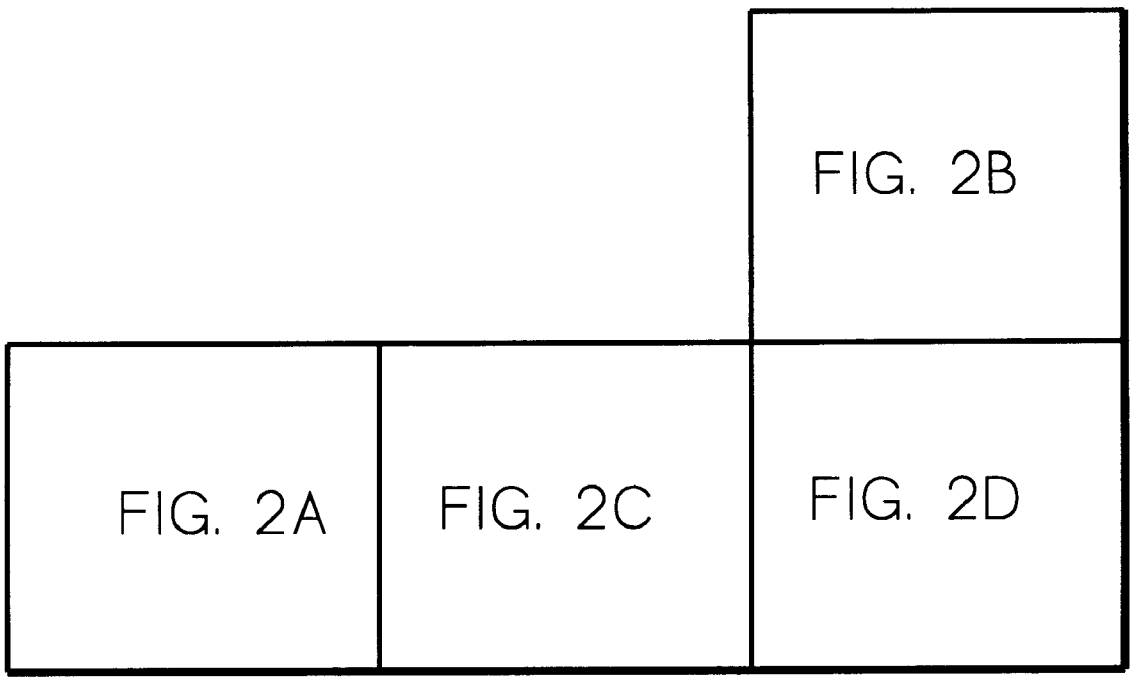
FIG. 2 illustrates how FIG. 2A through 2D relate, while the latter are block diagrams showing the implementation of a preferred embodiment of the invention within the microprocessor of FIG. 1.
Figure 2A:
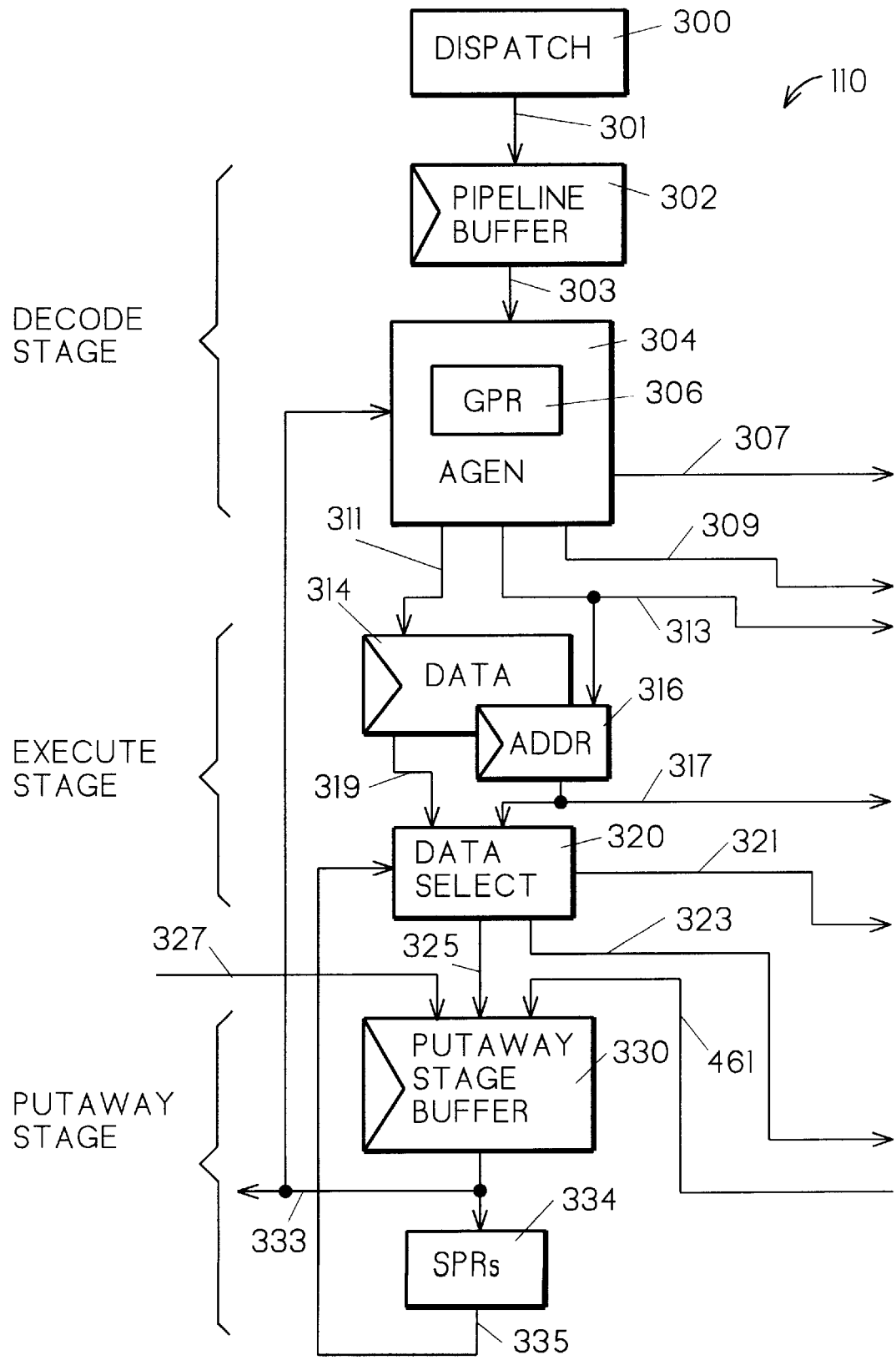

Referring to FIGS. 2A through 2C, and FIGS. 3–6, the core of microprocessor 100 will be described. FIG. 2A generally corresponds to load/store unit (LSU) 110, FIG. 2B to address translation unit (ATU) 124, and FIG. 2C to data cache unit (DCU) 116. FIGS. 3–6 generally correspond to L2 cache control unit (CCU) 118 and processor interface unit (PIU) 120.

Dispatch block 300 directs instructions from instruction unit 112 to the DECODE stage buffers of the various execution units 106, 108, 110, including on bus 301 (which is that portion of buses 123 directed to LSU 110) to LSU pipeline buffer 302.

The function of load/store unit 110 is to generate effective addresses on 64 bit wide bus 313 for load and store instructions and to serve as a source and sink for GPR data. During writes to cache 400, registers 314 and 316 hold the data and address, respectively; the effective address is on bus 313, and data select block 320 puts the data out on bus 323. During cache reads, data from cache 400 comes in on line 461, is latched in register 330, and from there sent on line 333 to general purpose registers 306 or to fixed point unit 106.

The output of LSU pipeline buffer 302 is fed on line 303 to the LSU decode and address generation block AGEN 304, which contains the general purpose registers 306 and address generation MRU adders. The data output of decode block 304 is fed on lines 311 to data register 314 and thence on line 319 to data select block 320. The address output of AGEN 304 is fed on lines 313 to EXECUTE stage buffer 316, and on bus 309 to real address MRU 430. AGEN 304 output also includes control line 307, which it sets to indicate either real or virtual mode addressing to data cache control block 470.

The outputs of buffer 316 are fed on lines 317 to data select block 320 and to data cache address register 408, DIR address register 414 and register slot MRU address register 406. The output of register 408 is fed on line 409 to multiplexer 412. Data select block 320 contains the data to be stored to data cache 400 from load store unit 110, and this is fed thereto on store data output lines 323 via multiplexer 432, lines 433, align block 460, lines 461, register 456, lines 457, and line 427 via multiplexer 426. Data select block 320 also provides control signals to data cache controller 470 on lines 321. The other inputs to multiplexer 432 are (1) L2 corrected data 609 via multiplexer 426 and line 427, which is also fed to data cache 400, (2) bypass data to DC on line 621, and (3) unaligned data (aka store merging and correction) register 452 via lines 453 to line 427 via multiplexer 426. Multiplexer 432 output line 433 is also fed via align block 460 and line 461 to register 456 and thence via multiplexer 424 to L2 cache controller on line 425, along with the output of castout buffer 450 on line 451. Align block 460 is, in this embodiment, a barrel rotator or shifter which aligns D cache 400 data to quad word boundaries on reads, and from multiplexer 432 to quad word boundaries on stores.

An effective address from instruction unit 112 on line 367 (a portion lines 131) is latched in register 364 and fed on line 365 to ITLB 358 and to the compare and address select block 356 at ISLB 354. Line 313 from AGEN 304 is latched in register 384, and fed on line 385 to DTLB array 378 and compare and address select block 374 at DSLB 376. In this preferred embodiment, DTLB 378 may be a standard design, such as that described by Liu, supra. Whereas the Liu TLB design is 32 bits wide, in this preferred embodiment a 64 bit wide TLB 378 is used.

Data select 320 output on line 325 is fed to PUTAWAY stage buffer 330, which also receives data on lines 461 from data cache 400 (via lines 401 and align block 460) for LSU 110, and FPU 108 results on line 327 which is a portion of bus 127. The output of PUTAWAY stage buffer 330 is fed on lines 333 to a floating point register in FPU 108, special purpose registers 334 (among which are the timers), and general purpose registers 306. Special purpose registers 334 output line 335 is fed back to data select block 320 which allows the processor to read them. Line 333 carries the data for FPU 108 when doing a fetch from cache 400.

The selected output of instruction segment look aside buffer (ISLB) 354 is fed on lines 355 to comparator 362, along with the virtual address output of ITLB 358 on lines 359. ITLB real address output lines 361 are input to IC controls 350 (which includes instruction directory 352) and status information on line 361 is fed to ATU controls 370. The output of comparator 362 is fed on lines 363 to IC controls 350 and to ATU controls 370. The output of DSLB 376 is fed on lines 377 to comparator 382, along with the output of DTLB 378 on lines 379. The output of comparator 382 is fed on lines 383 to ATU controls 370 and DC control 470. DTLB 378 status output 381 is fed to ATU controls 370 and DC control 470. ATU controls 370 outputs include control lines 369 to data cache controller 470, L2 address 371 and ATU write data 373. IC controls 350 output is L2 address line 351. Real address from DTLB 378 is fed on lines 381 to DC address register 408 and directory address register 414.

Predicted real address MRU 430 output signals on line 431, representing the predicted read address bits 50:51, are latched in registers 410 and 416. The output of data cache address register 410 on line 411 is multiplexed with bits 50:51 of the output of register 408 in multiplexer 412, and its output is fed on address lines 413 to data cache 400. The remaining bits of DC address register 408 are fed straight through on line 413 to data cache 400. Similarly, the output of register 416 is fed on lines 417 to multiplexer 436, where it is multiplexed with bits 50:51 of the output of register 414 on line 415, and the result fed on lines 437 to directory array 440. The output of register 414 on line 415 is also fed to address register 408.

The function of real address MRU 430 is to provide predicted real address bits 50:51 to data cache 400 and directory array 440.

During the fetch stage, data cache 400 output 401 is fed to unaligned data register 452 and align block 460, and thence on line 461 to registers 456 and 330. Line 401 contains the data to be read from data cache 400 by the load store unit 110, snoop data to the L2 cache controller 118, merge data for partial stores to the data cache 400, and castout data to castout buffer 450. Slot MRU 402 output line 403 controls the selection of one of four sets of data to load on bus 401 through a multiplexer (not shown) on the output of data cache 400.

The output of castout buffer 450 is multiplexed in multiplexer 424 with the output of register 452 on lines 453 and line 457 from DC putaway register 456, the output appearing on lines 425 to the L2 cache controller. The output of register 452 along with DC putaway register 456 and L2 corrected data on line 609 is also fed to data cache input multiplexer 426, the output of which appears on lines 427 to data cache 400 and multiplexer 432. The output of register 406 is fed on line 407 to slot MRU 402. Slot MRU 402 output 403 is fed to data cache 400 where it controls a data multiplexer which selects the appropriate cache set (as taught by Liu, supra.)

Data cache (DC) control 470 receives inputs from directory array 440 on lines 441 (signifying a directory array hit or miss), from AGEN 304 on lines 307, data select and execute cycle control block 320 on lines 321, ATU controls 370 on lines 369, and comparator 382 on lines 383. Its output is fed to L2 address line 471, and includes a signal signifying a miss condition. Miss information is also sent to ATU controls 370 and PA controls (not shown) in LSU 110.

The function of data cache control 470 is to control the data flow multiplexing into and out of data cache 400 and send results to the load/store unit 110, address translation unit 124, and L2 cache control unit 118, and also to control writing of data into data cache 400.

Data directory 440 contains address tags to indicate if the contents of the real address are present in cache 400, and the status of the cache lines, whether modified, shared, or invalid. It also contains an LRU pointer for each congruence class, indicating which cache 400 line should be replaced.

Address translation unit (ATU) control 370 handles translations from effective addresses to virtual addresses to real addresses. It receives as inputs L2 corrected data on line 353, and provides TLB reload data output on lines 375 to instruction translation lookaside buffer (ITLB) 358 and data translation lookaside buffer (DTLB) 378, ISLB 354, and DSLB 376. With respect to look aside tables 354, 358, 376, 378, if a miss condition is detected, ATU sequencer 370 requests data (address and length) to L2 cache on bus 371 (FIG. 6.) When L2 responds on bus 353 (FIG. 5), ATU examines the data to select data for look aside buffer 378, 376, 354, 358, as the case may be, or signals a translation exception back to the instruction unit. ATU controls 370 tracks segment and page table updates and sends them to L2 controls on line 371. Line 381 provides the real address to the data cache directory for comparison.

The effective address is compared in ISLB 354 comparator 356 with the virtual address. If these match, then a valid effective to virtual address translation exists in buffer 354, which transmits the virtual address on line 355 to compare block 362.

ITLB 358 is accessed by an effective address on line 365 from register 364 for doing virtual to real address translation. The address input to ITLB 358 is a portion of the effective address from IU 112 on lines 367. Comparator 362 compares virtual addresses on lines 355 and 359, and signals the result on line 363. Associated with each virtual address in ITLB array 358 is a real address. The signal on line 363 indicates whether or not the address on line 361 is valid.

DTLB 378 is accessed by an address from register 384. Comparator 382 compares data on lines 379 and 377, and signals the result on line 383. The signal on line 383 indicates whether or not the address on line 379 is valid.

System Bus Interface 120

Figure 3:
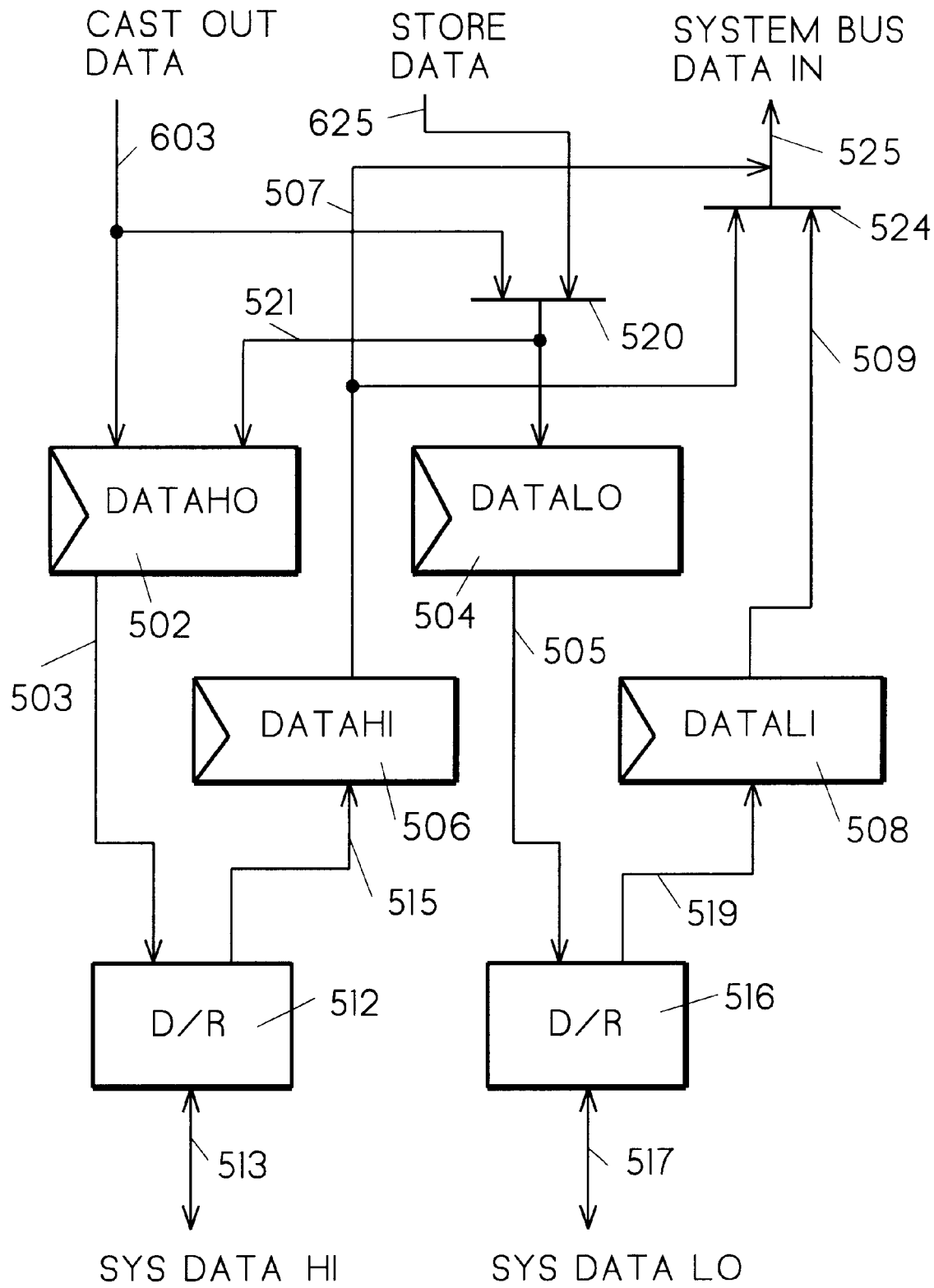
FIGS. 3–6 are block diagrams illustrating the system and L2 cache bus interfaces 101 and 103 of FIG. 1, with FIG. 3 generally illustrating the system data bus.

Referring to FIGS. 3 though 6, the system bus interface 120 and L2 cache control unit 118 of FIG. 1 will be further described.

Correspondence between the high level block diagram of FIG. 1, and the more detailed illustration of the preferred embodiment in FIGS. 3 to 6, is as follows. Bus 101 of FIG. 1 corresponds in FIGS. 3–6 to system controls lines 559 at driver/receiver 556, system address lines 569 at driver/receiver 564, system data hi bus 513 at driver/receiver 512, and system data low bus 517 at driver receiver 516. Bus 103 to L2 cache 104 of FIG. 1 corresponds to L2 cache address lines 691 out of driver 690, L2 tag address line 693 out of driver 692, L2 tag data lines 697 at driver/receiver 694, and L2 cache data bus 645 at driver/receiver 644. ICU bus 109 of FIG. 1 corresponds (from ICU) to IC request lines 351, and (to ICU) DOIC register 606 output lines 607, and bypass to IC multiplexer 616 on lines 617. DCU bus 111 of FIG. 1 corresponds (from DCU) to DC request lines 471 and data cache write data bus 425, and (to DCU) to bypass to DC multiplexer 620 on lines 621 and data cache data out (DODC) register 608 output line 609. Address translation unit (ATU) input/output bus 107 of FIG. 1 corresponds to ATU request lines 371, ATU write data bus 373, and multiplexer 612 output lines 353.

Figure 4:
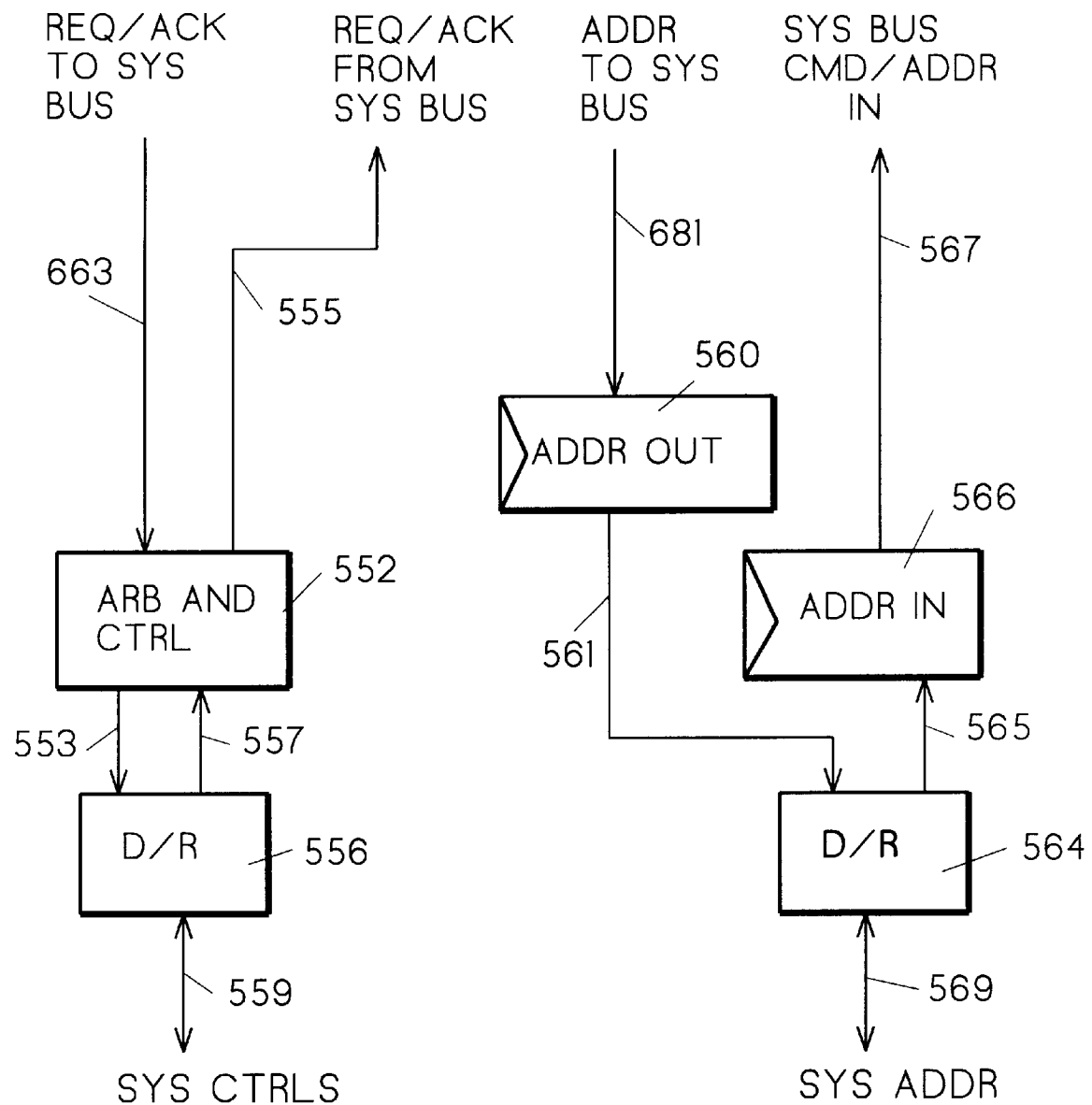

Referring to FIGS. 4 and 6, requests to L2 cache control 118 are latched in address/command register 650 from ATU request lines 371, IC request lines 351, DC request lines 471, and on lines 567 from address in register 566, which latches system bus addresses on lines 565 from receiver 564. These address/command signals are latched as required in registers 650, 652 and 654 connected via lines 651 and 653. The output of the third register 654 is fed to controls block 660 on line 655. The output of first stage register 650 is fed on lines 651 to register 652, driver 690 to provide L2 cache address signal 691, driver 692 to provide L2 tag address signal 695, ECC checking circuit 684, address comparator 664, controls block 660, cache controller (CC) snoop address register 670, processor address registers CBPADR 674 and CBMADR 676, and address multiplexer 680. ECC 684 output is fed on lines 685 to driver 694 to provide L2 tag data on lines 697. CBPADR address register 674 contains the address to the system bus in the event of a cache miss, the output of which is fed to multiplexer 680 on line 675. CBMADR address register 676 contains the snoop address portion, and its output is fed to multiplexer 680 on line 677. Receiver 694 output from L2 tag data lines 697 is fed on lines 695 to L2 tag in register (L2TAGIN) 688 and thence on lines 689 to error correction code (ECC) block 686. The output of ECC block 686 is fed on lines 687 to comparator 664, address registers 670, 674 and 676. The output of comparator 664 is fed on line 665 to controls block 660. CCS address register 670 output line 671 represents the data cache snoop address. The output of address out multiplexer 680 is fed on lines 681 to address out register 560, and thence on line 561 to the system address bus 569 through driver 564. The output of controls block 660 is fed on lines 663 to arbitration and control block 552, and on lines 661 to address/command register 658. Arbitration and control block 552 receives control data from receiver 556 via lines 557, and provides output on lines 555 to controls block 660, and in the event of an L2 cache miss request out control signals are sent on line 553 through driver 556 to system controls bus 559. Another output of controls block appears on lines 661 to address/command register 658, the output of which appears on line 659 to multiplexer 672. Multiplexer 672 also receives input from lines 653 and 655, and provides its output on lines 673 back to register 650.

Figure 5:
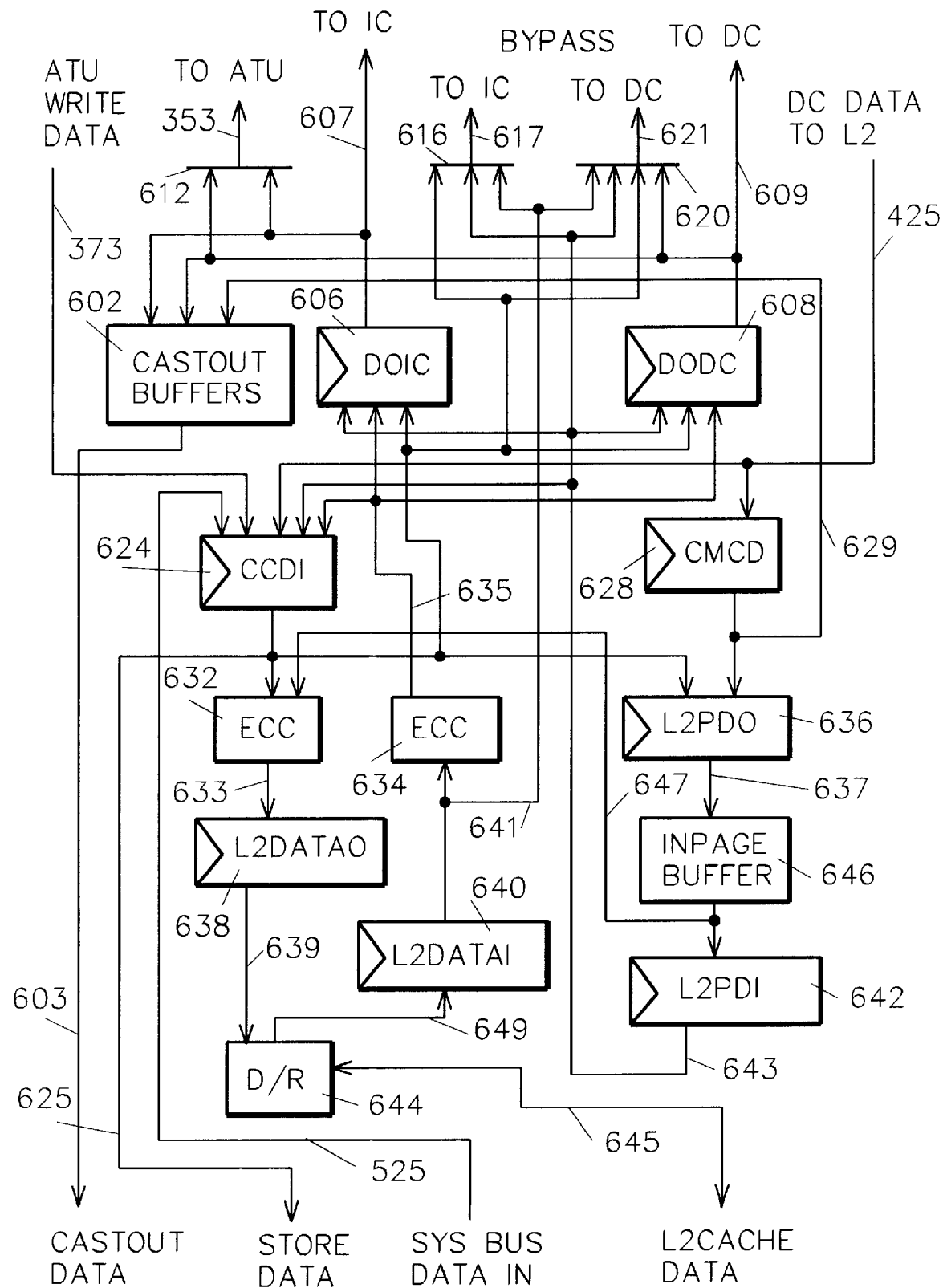
Figure 6:
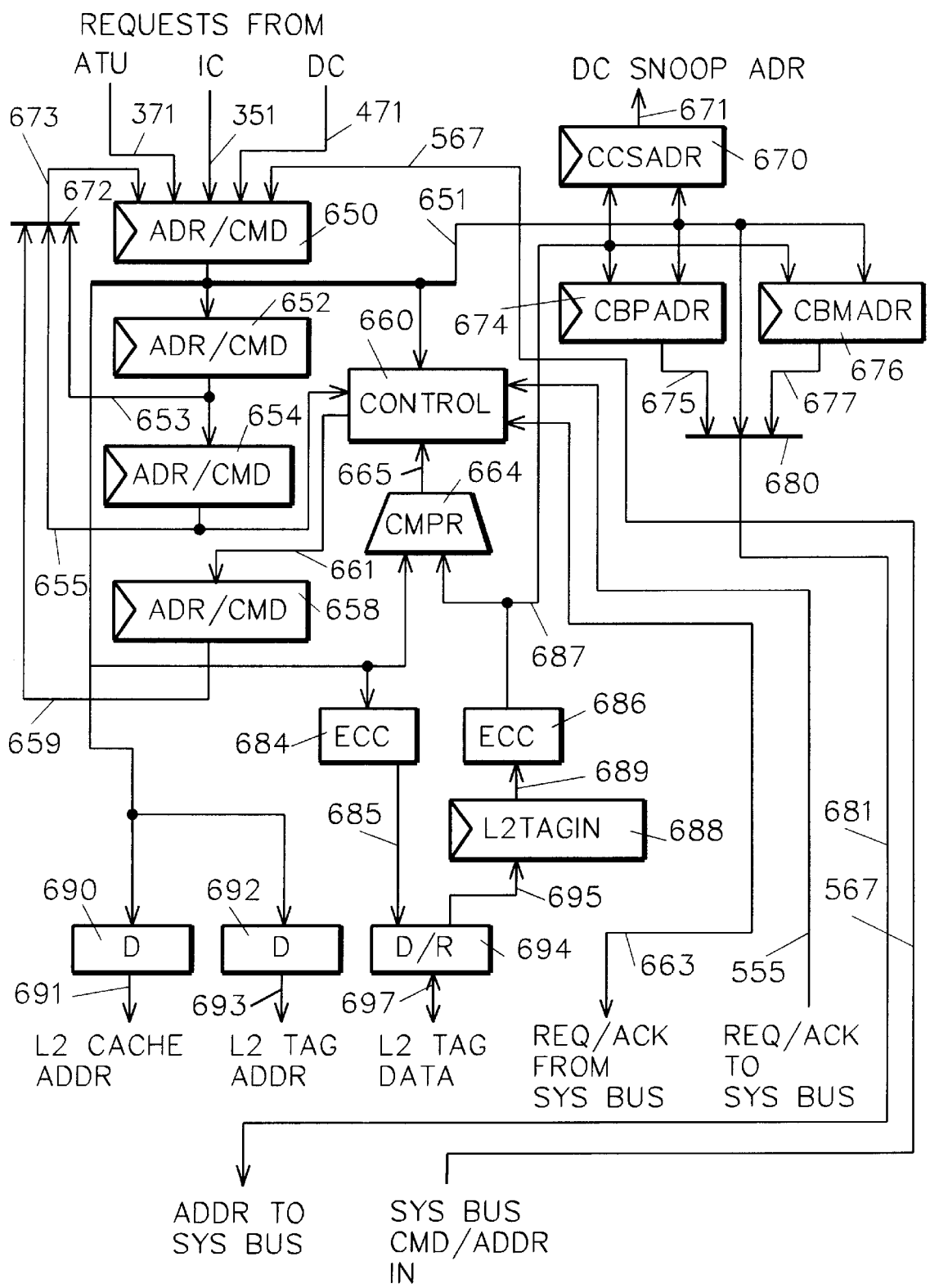
Figure 7:
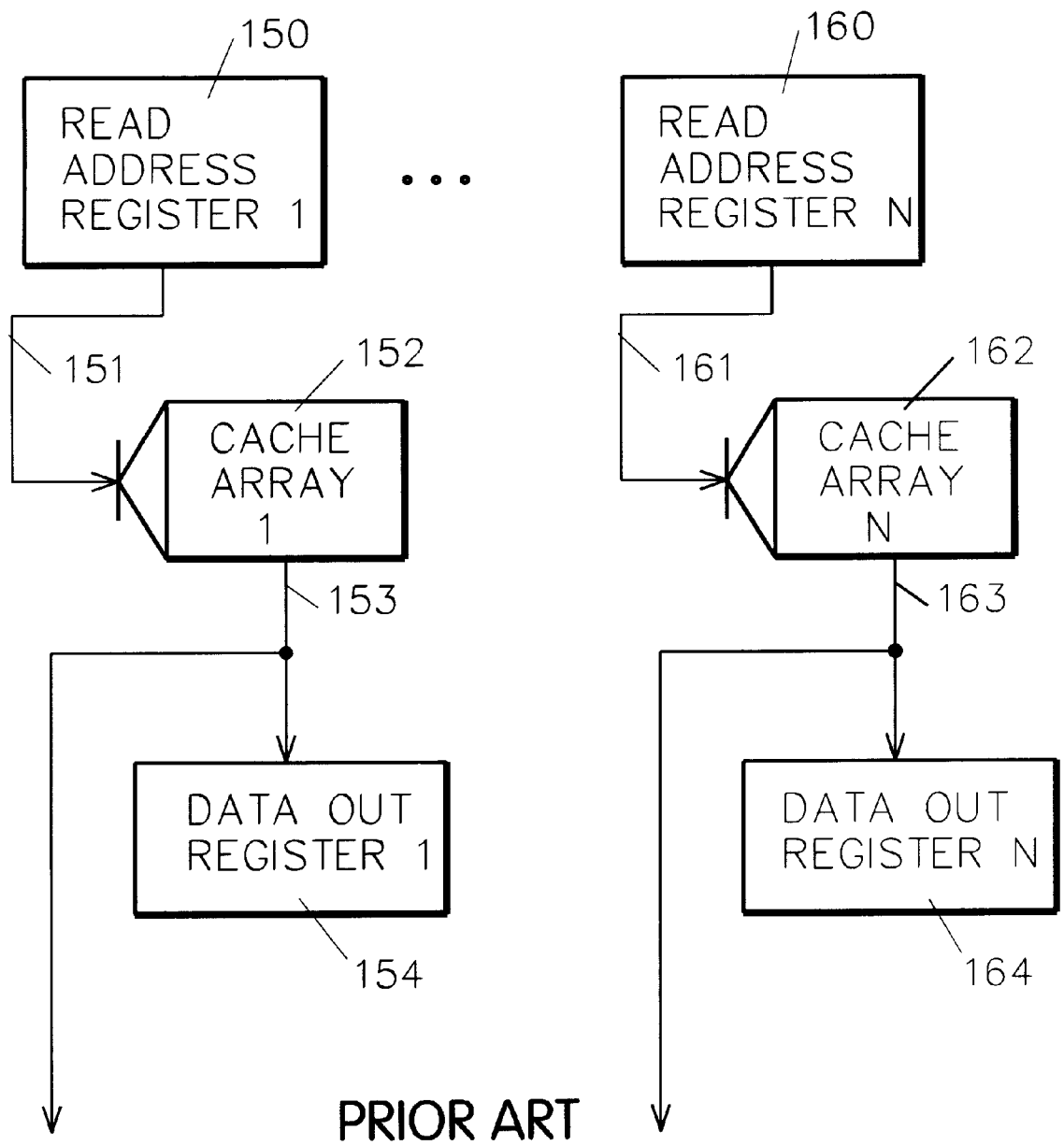
FIG. 7 is a block diagram illustrating a typical N-way cache array.

Referring to FIG. 5, ECC block 632, DOIC register 606, DODC register 608, L2PDO register 636, multiplexer 616 and multiplexer 620 each receive inputs from data input register 624 on bus 625. The output of ECC block 632 is fed on line 633 to L2 data out register 638, and thence to driver 644 on line 639. The output of L2PDO register 636 is fed on line 637 to inpage buffer 646, the output of which is fed on line 647 to L2PDI register 642 and ECC circuit 632. The output of L2PDI register 642 is fed on line 643 to DOIC register 606, DODC register 608, CCDI register 624, and to bypass multiplexers 620 and 616. The output of multiplexers 620 and 616 represent bypass data, and are fed on lines 621 and 617 to the DC and IC, respectively. Data cache write data line 425 is fed to CMCD register 628 and CCDI register 624. The output of CMCD register 628 is fed on lines 629 to L2PDO register 636, and castout buffers 602.

Referring to FIGS. 3 and 5, L2 cache data in from bus 645 is received at receivers 644, fed on line 649 to L2 data in register 640 and thence on lines 641 to ECC circuitry 634 and bypass multiplexers 616 and 620. From ECC circuitry 634, L2 cache data in is fed on lines 635 to cache controller data in register (CCDI) 624, DOIC register 606 and DODC register 608. DODC register 608 output 609 is fed to data cache unit 116 (FIG. 1), DC bypass multiplexer 620, ATU multiplexer 612, and castout buffers 602. The output of DOIC register 606 is fed on lines 607 to instruction cache unit 114 (FIG. 1), ATU multiplexer 612, and castout buffers 602. Castout buffers 602 output on lines 603 is fed to data high output register 502 and multiplexer 520, the output of which is fed on lines 521 to data output registers 502 and 504.

In operation, registers 624 and 636 form a pipeline buffer to inpage buffer 646 and register 642. Inpage buffer 646 caches a line from the system bus. Line 641 from L2 data in register 640 to bypass multiplexers 616, 620 allows the saving of a cycle on cache misses when error correction is not required. DOIC register 606 provides corrected data to instruction cache unit 114, and DODC provides corrected data to data cache unit 116. Either register may supply data to the ATU 124.

The normal path for routing L2 cache data is through register 640, ECC 634, and DOIC register 606 and DODC register 608.

Processor Interface Unit 120

Referring now to FIG. 3, a more detailed description of processor interface unit 120 of FIG. 1, and associated circuitry, will be provided. FIG. 3 represents the data flow portion of PIU 120 and System Bus 102.

System bus 102 data high bus 513 and data low bus 517 communicate through driver/receivers 512 and 516, respectively with data high output register 502 on lines 503, data high in register 506 on lines 515, data low out register 504 on lines 505, and data low input register 508 on lines 519. Each of busses 513, 517 is capable of handling eight bytes of data, providing a 16 byte data bus. If the system is operating on only eight bytes, only one set of the input/output registers (such as 504, 508) is used.

System data input registers 506, 508 outputs on lines 507 and 509, respectively, are fed to multiplexer 524 and thence, along with registers 506 on lines 507, on lines 525 to cache control data in (CCDI) register 624 (FIG. 5), which is the main data input register of the cache controller. Data input register 624 output is fed on bus 625 to multiplexer 520.

Load/Store Unit (LSU) 110

Load/store unit (LSU) 110 functions to decode fixed point and floating point loads and store and cache management operations, and to send effective addresses and storage commands to the data cache unit (DCU) 116. LSU 110 also handles most move-to and move-from special purpose register (SPR) 334 instructions. In addition to functioning as a load/store unit, LSU 110 also controls instruction execution sequencing after instructions have been dispatched, through detection of most instruction execution interlocks, and the generation of resulting pipeline hold signals.

LSU 110 provides a six port register file 306, made up of four 32/18 register array macros, arranged as a 32×72 array with two write ports and four read ports. This array implements the 64-bit general purpose registers (GPRs) 306. GPR array 306 also provides operands for fixed point unit (FXU) 106 decode stage (not shown) as well as for LSU 110. FXU 106 decodes its own instructions and generates requests to LSU 110 for the necessary operands, as well as providing on line 327 a result operand and address when appropriate. LSU 110 accesses GPRs 306 for registers needed to generate effective addresses (EA), and for data for store instructions. Data operands received from data cache 116 on line 461, and updated effective addresses are written back to the GPRs by LSU 110. Lines 327 contain the FPU results, and are fed to register 330.

In handling floating point loads and stores, LSU 110 generates effective addresses using operands from GPR 306, and accesses the necessary floating point register (FPR) operands from the floating point unit (FPU) 108.

Instructions dispatched to LSU 110 are latched in its DECODE cycle instruction register 302 at the end of the I-fetch cycle. The basic LSU 110 pipe is three stages: DECODE 302/304, EXECUTE 316/320, and PUTAWAY 330. During the DECODE cycle corresponding to 302/304, the instructions are decoded, and operands are fetched from the GPR 306 array. Addressing operands are gated to a 64-bit address generation (AGEN) adder, and a 64-bit effective address is calculated. The effective address (EA) is sent on lines 313 to the address translation unit (ATU) 124 and to data cache unit (DCU) 116 and latched at the end of the DECODE cycle in pipeline buffer 316 which holds the effective address during the EXECUTE cycle.

During the EXECUTE cycle, the operand for store operations is passed to the DCU on line 323, where it is aligned in block 460 and saved in register 456 for PUTAWAY in D-cache 400. At the end of the EXECUTE cycle, if a load type instruction is being executed, the data operand returns on line 461 to LSU 110 from the DCU, and is saved in pipeline buffer 330 for PUTAWAY.

During PUTAWAY cycle 330, as is represented by lines 333, up to two 8-byte or one 16-byte operand may be written to GPR 306. Floating point loads are limited to one 8-byte operand per cycle. GPRs 306 are not written until late in the PUTAWAY cycle 330. This requires that operands being written to these arrays be bypassed around the arrays to reduce pipeline interlocks. Delaying the write to GPR 306 also allows sign extension for algebraic load operations to be performed, helping to balance path delays between EXECUTE 316/320 and PUTAWAY 330 cycles for these instructions.

Fixed Point Unit (FXU) 106

Fixed Point Unit (FXU) 106 executes the fixed point instructions, not including storage access instructions. FXU 106 includes a 64-bit adder, a 64-bit logical unit, a 64-bit rotate-merge unit, and a 64-bit carry save adder which supports two-bit-per-cycle product formation during multiply instructions.

During division, quotient formation occurs one bit per cycle, through repeated subtraction of the divisor from the shifted dividend.

Floating Point Unit (FPU) 108

Floating point unit (FPU) 108 executes the floating point instructions, but not the storage access instructions. In one exemplary embodiment, FPU 108 includes a 5-port 32×72-bit register array, a 32-bit status-control register, a 3-bit overlap scan booth encoder unit, 2-bit quotient generation unit, a 106-bit carry save adder, a 106-bit increment-full adder, an operand alignment shifter unit, a normalizer unit, and a rounder unit.

Address Translation Unit (ATU) 124

Figure 2B:
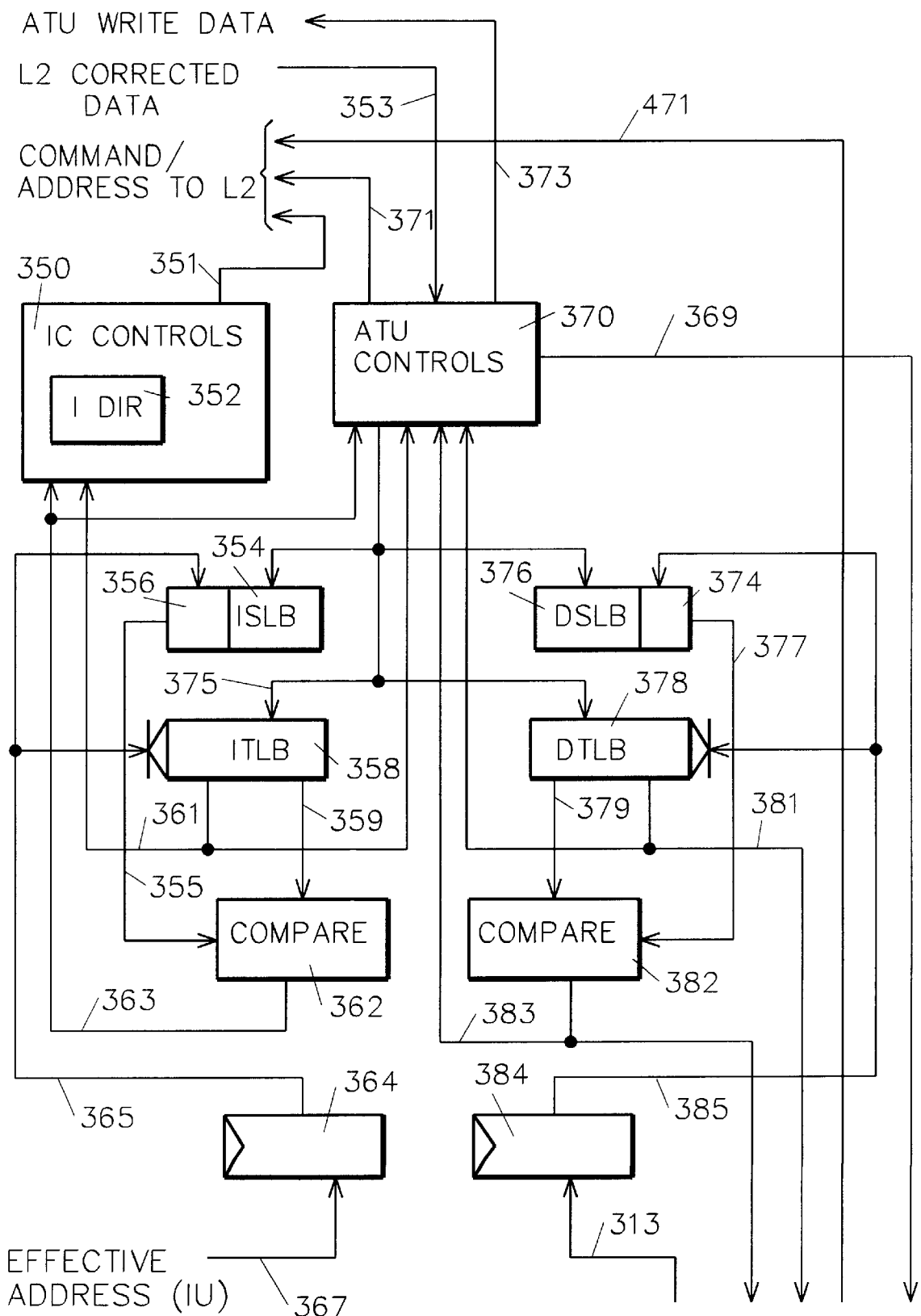
Figure 2C:
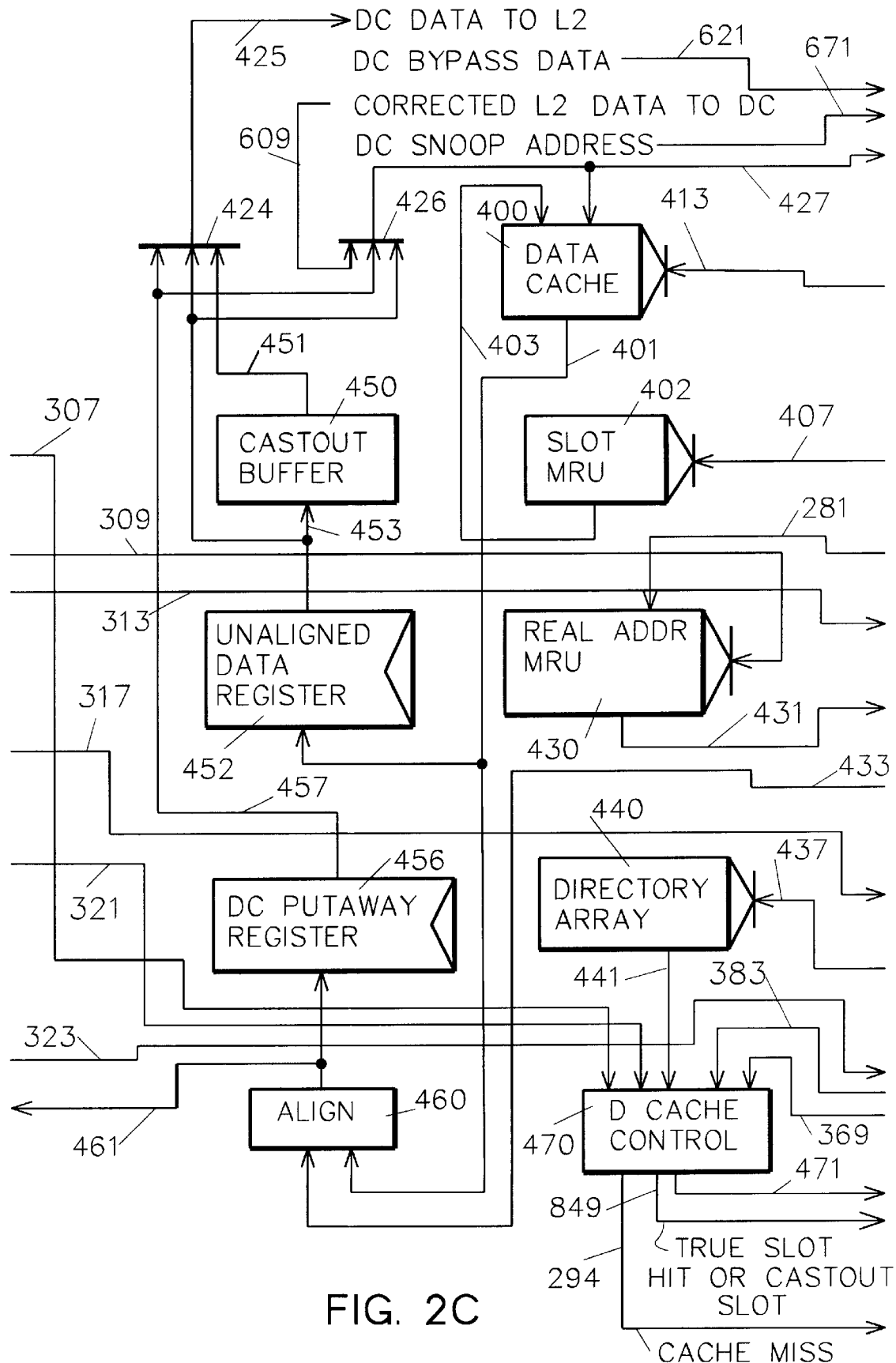
Figure 2D:
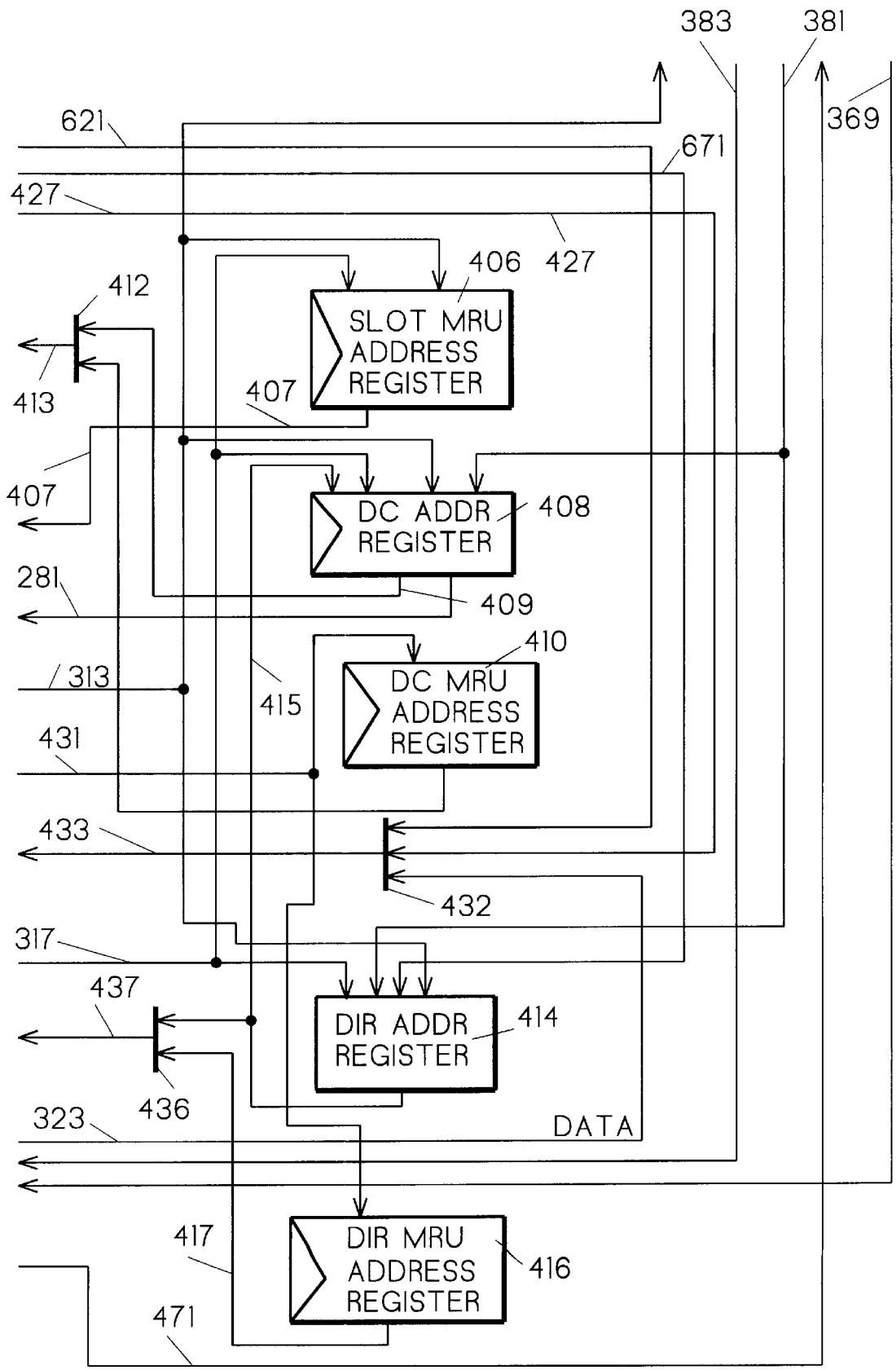

Referring, primarily, to FIG. 2B, address translation unit (ATU) 124 translates the data effective address (EA) from load/store unit (LSU) 110 and the instruction effective address from instruction unit 112 into real addresses used by the Data and Instruction Caches to access their L1 Caches and used by the L2 Cache Control Unit 118 to access the L2 Cache 104.

Microprocessor 100 implements segment lookaside buffers (SLB) 354, 376 and translation lookaside buffers (TLB) 358, 378, which function as caches for segment and page table entries. When a required entry is not found in a look aside buffer, ATU 124 initiates a fetch to L2 cache control 118 to access segment and page table entries from memory 126 or L2 cache 104.

ATU 124 reports any translation data storage interrupts (DSI) to the load/store unit 110 and any translation instruction interrupts to the instruction unit 112. Reference, change and tag change bits are all updated by store requests to cache control 118 from ATU 124.

Microprocessor 100 provides a 4-entry SLB 354 for instruction address translation and an 8-entry SLB 376 for data address translation. SLBs 354, 376 contain the most-recently translated segments in a fully associative arrangement. The ESID (Effective Segment ID) portion of the effective data or instruction address is compared 356, 374 simultaneously to all entries in the respective SLB 354, 376 ESIDs when segment translation is enabled.

ATU 124 includes separate instruction and data TLBs 358, 378, respectively, to hold the results of virtual to real address translations. With virtual to real translation active, the VSID from the matching SLB 354, 376 is compared in comparators 362, 382 against the VSID stored in the TLB 358, 378. If a compare is found, the Real Page Number (RPN) stored in the matching TLB 358, 378 entry is used to form the real address. Replacement is managed independently in each TLB 358, 378 by an LRU bit for each of the 256 pairs of entries.

L1 Data Cache Unit (DCU) 116

In a preferred embodiment, Li data cache unit (DCU) 400 has the following attributes: 64 KB size, 64 byte line size, 4-way set-associative, 2 subline-modified bits per line, MRU slot selection, 40-bit real address, 16-byte dataflow to/from processor, store-in design, and multi-processor support. The term "cache line" refers to a 64-byte block of data in the cache which corresponds to a single cache directory entry.

Slot MRU 402 provides selection of one of four sets of cache data during an execute cycle. Real address MRU 430 supplies bits 50:51 to cache 400 and cache directory 440. Error correction ECC (not shown) is provided on cache 400 and each directory 440. Write-thru mode is implemented.

The data cache 116 array 400, representing a collection of sub arrays 152, 162, is based on a 1024×78 1R1W "virtual" 2-port array macro, where two of these comprise one of sub arrays macros 152, 162. It provides for a read operation followed by a write operation within a processor cycle. Read data remains valid on the array outputs until the next read operation begins even if there is an intervening write operation. Eight of these arrays are used to form a 64 KB cache 400. Two arrays are used per slot to form a 16-byte dataflow in and out of the array, represented by lines 401. Data parity is stored in the array. The last bit stored in the array is odd address parity across bits 50:59 of the address used to access the data cache.

Two arrays are needed to implement data cache directory 440. The directory implements a 28-bit real page number (RPN) along with five ECC check bits. A valid and two subline modified status bits are maintained, and three check bits are stored with them. The RPN and status fields are replicated four times to represent the four sets accessed at a particular directory array address. A 3-bit LRU is shared between two directory arrays to indicate the least recently used slot.

Slot MRU 402 logically appears as a 1024×4 array where each entry is associated with a cache line in data cache 400. Bits 48:51 of the 48:57 used to access the logical array 400 are effective address bits. MRU 402 bits are updated whenever an incorrect slot guess or a cache miss occurs.

Real address (RA) MRU 430 is used to generate a prediction of real address bits 50 and 51 for addressing both cache 400 and cache directories 440. As is represented by line 309, array 430 is read as part of the AGEN stage 304 of the pipeline. If a load/store unit pipeline EXECUTE stage or latched PUTAWAY stage hold is present, then the array 430 output is not used. Real mode is also used to determine if the array 430 (FIG. 2C) output is used. Real mode determination occurs in AGEN 304 which sets control line 307 to either the real or virtual mode addressing. If real mode is determined, then load/store effective address (LSEA) 317 bits 50:51 are used by register 408 to access cache 400 and register 414 to access cache directory 440 instead of RA MRU array 430 output.

Real address (RA) MRU array 430 is updated from DC address register 408 via lines 281 whenever a wrong prediction occurs with respect to translated address bits 50:51. Also, data cache address register 408 and data cache directory address register 414 are updated with proper values of address bits 50:51 via line 381 for reaccessing the cache 400 and cache directory 440 arrays. Multiplexer 412 is then switched under control of data cache control block 470 so that address register 408 is used to access cache array 400. A similar function occurs with multiplexer 436 so that register 414 is used to access the directory array 440. The LSU 110 pipeline is stalled for one cycle to allow cache 400 and directory 440 to be reaccessed in parallel in the same cycle. Data is then returned to LSU 110 via line 461 in the following cycle.

Instruction Cache Unit (ICU) 114

Instruction Cache Unit (ICU) 114 contains the physical arrays, address compares, and error checking circuitry to provide a 64 KB 4-way associative instruction cache with single-bit error detection and recovery. The single-cycle cache access provides up to four instructions from a selected 128-byte cache line. Instruction cache unit 114 provides instructions to other functional units, including branch prediction.

L2 Cache Control Unit 118

The functions of the L2 cache control unit 118 are to provide processor 100 with access to a private L2 cache 104, plus access to memory 126 through system bus 102 which also supports memory coherence control for multi processor operations. L2 cache 104 is implemented as external static RAMs, with one set of SRAMs for the directory and another set for the data.

CCU 118 accepts commands from four sources: data cache unit 116, instruction cache unit 114, address translation unit 124, and system bus 102 via Processor Interface Unit (PIU) 120. To handle these commands, CCU 118 uses the buffer structure shown in FIG. 6. External and internal commands are prioritized by CCU controls 660 and placed into ADR/CMD buffer 650. ADR/CMD buffer 650 output 651 is then used to access an L2 directory (not shown) via interface lines 693 driven by driver circuits 692 to determine the hit/miss status. Additionally, appropriate address bits from bus 651 are concurrently used to access an Li status array (not shown) in controls 660 to determine if a data cache snoop needs to be done. Finally, ADR/CMD buffer 650 is used to control updating status and tag information in the L2 directory as required, a process well understood in the art.

The four L2 hit/miss states are:
1) Modified
   This line is different from memory and no other coherent cache has a copy of this line.
2) Exclusive
   This line is the same as memory and no other coherent cache has a copy of this line.
3) Shared
   This line is the same as memory and other caches may have a copy of this line.
4) Invalid
   This cache and this processor's data cache do not have a copy of this line.

Data can be in the data cache only if it is also in the L2 cache.

Commands only stay in ADR/CMD buffer 650 for three cycles, at which time the command moves to ADR/CMD buffer 652 or ADR/CMD buffer 658. A processor command is moved into the ADR/CMD buffer 652 when said command is in ADR/CMD buffer 650 and the resources it needs, such as the data flow, are not available. The command will stay in ADR/CMD buffer 652 until the resource becomes available.

Commands are moved to the ADR/CMD buffer 658 from ADR/CMD buffer 650 by way of controls block 660 when a system bus snoop command needs to use the data path. The command will stay in ADR/CMD buffer 658 until the data path is available. Commands that need to issue address commands on the system bus are placed in ADR/CMD buffer 654. The command will stay in ADR/CMD buffer 654, being retried if necessary, until a successful address status and response is received from system bus 102. If data movement is required the command is then turned over to the CCU data flow logic.

Feedback from ADR/CMD buffer 658 to ADR/CMD buffer 650 is necessary for two separate functional operations. The first feedback case is for processor read commands that encountered a shared address response from system bus 102. When the processor read command is first in the ADR/CMD buffer 650 the L2 directory is marked Exclusive, assuming that this L2 will have the only copy of the data. If another device indicates that it also has a copy of this data, by a shared address response on system bus 102, then the L2 directory must be changed from Exclusive to Shared.

The second feedback operation is used for processor write operations that must wait for a successful system bus 102 address status and response before the data can be written. For processor stores or data-cache-block-zero (dcbz) instructions that hit shared in the L2 directory, the processor must make sure that it holds the line in the exclusive state before it updates the data. Before the processor can get ownership of the shared line it may lose the line to another device, so the feedback path is provided to reinstate the directory access.

L2 Cache Control Unit Snoop Operations

Snoop commands from system bus 102 come in through processor interface unit 120 and are presented to ADR/CMD buffer 650 via bus 567. At the same time a shift register (not shown) is started. The shift register is used to 'time out' the snoop command. Snoop commands require a response within a fixed time, but the command may be delayed before being brought into ADR/CMD buffer 650 because of other higher priority commands. If the shift register 'times out', an address retry response will be issued to the system bus 102.

When a snoop command is accepted into ADR/CMD buffer 650 the L2 directory and L1 status array are checked. If the command hits in the L2 directory and the L1 status array, then a snoop command is issued to the data cache. If data must be moved to complete the snoop command, it will be first moved out of the L2 cache into the castout buffer 602. Then if the data cache has a modified copy of the data, its copy of the data will be moved to the castout buffer 602 and subsequently via bus 603 to system bus 102.

The memory management policy is such that segment and page translation table entries may not be accessed directly from the L1 data cache by the ATU 124. Consequently, another type of snoop operation is done for ATU commands. When an ATU command comes in, the data cache is snooped using the Li status array. If the data cache has modified data, the ATU command is stopped until the data is moved from the data cache to the L2 data RAMs.

Processor Interface Unit (PIU) / Bus Interface Unit (BIU) 120

Referring to FIGS. 1 and 3, Processor interface unit (PIU) 120 controls and monitors all communications with the main system bus 102. The main functions of PIU 120 are:

1) Transport commands, address, and data between CCU 118 and system bus 102.
2) Prune out incoming command-address transfers that do not require the attention of CCU 118.
3) Compensate for clock domain differences between the processor 100 units and 6xx Bus 102.
4) Maintain and monitor system checkstop logic for Processor Run-Time Diagnostics (PRD).

System bus interface, or processor interface unit (PIU) 120, in general, receives commands from L2 cache controller (CCU) 118 on lines 663, transforms them in block 552 to the system bus clock domain and presents them on lines 559 to bus 102. It then monitors status and response information received on lines 559 for the command and informs CCU 118 on lines 555. As commands arrive from the bus on lines 559, PIU 120 categorizes them into one of three categories: master operations, snoop operations and other operations. Master operations are those originated by CCU 118 on the same chip 100 as PIU 120. These operations need to the monitored for status and response, updating CCU 118 as this information arrives. Snoop operations are those that are originated by other bus units and require the attention of CCU 118. PIU 120 will pass these operations on to CCU 118 indicating a snoop and continue to monitor status and response. Other operations are those originated by other units that do not require the attention of the CCU 118. For these operations, PIU 120 only monitors status and response without informing CCU 118.

Clock Distribution and Control 122

Clock distribution and control 122 contains the logic for gating, shaping, and distributing the internal clocks as well as the off chip cache and directory clocks.

During normal system operation, all clocks are derived from and synchronized to a single oscillator input by a phase locked loop (PLL) circuit which provide a 'zero delay' clock tree relative to the input oscillator and also a frequency multiplier function. Microprocessor 100 uses this function to run the internal processor logic at a faster rate than the system bus 102 interface logic, which runs at the same rate as the oscillator input. A second on-chip 100 PLL is employed to derive the clocks for the off-chip L2 cache 104. This PLL uses the frequency multiplied output of the first PLL as its input. An off-chip feedback path, constructed to match the path to the cache chips, results in a low skew delay relative to the processor clock domain and allows for synchronous communication between processor 100 and cache 104.

Part 2

Data Register for Multicycle Cache Read

Figure 10A:
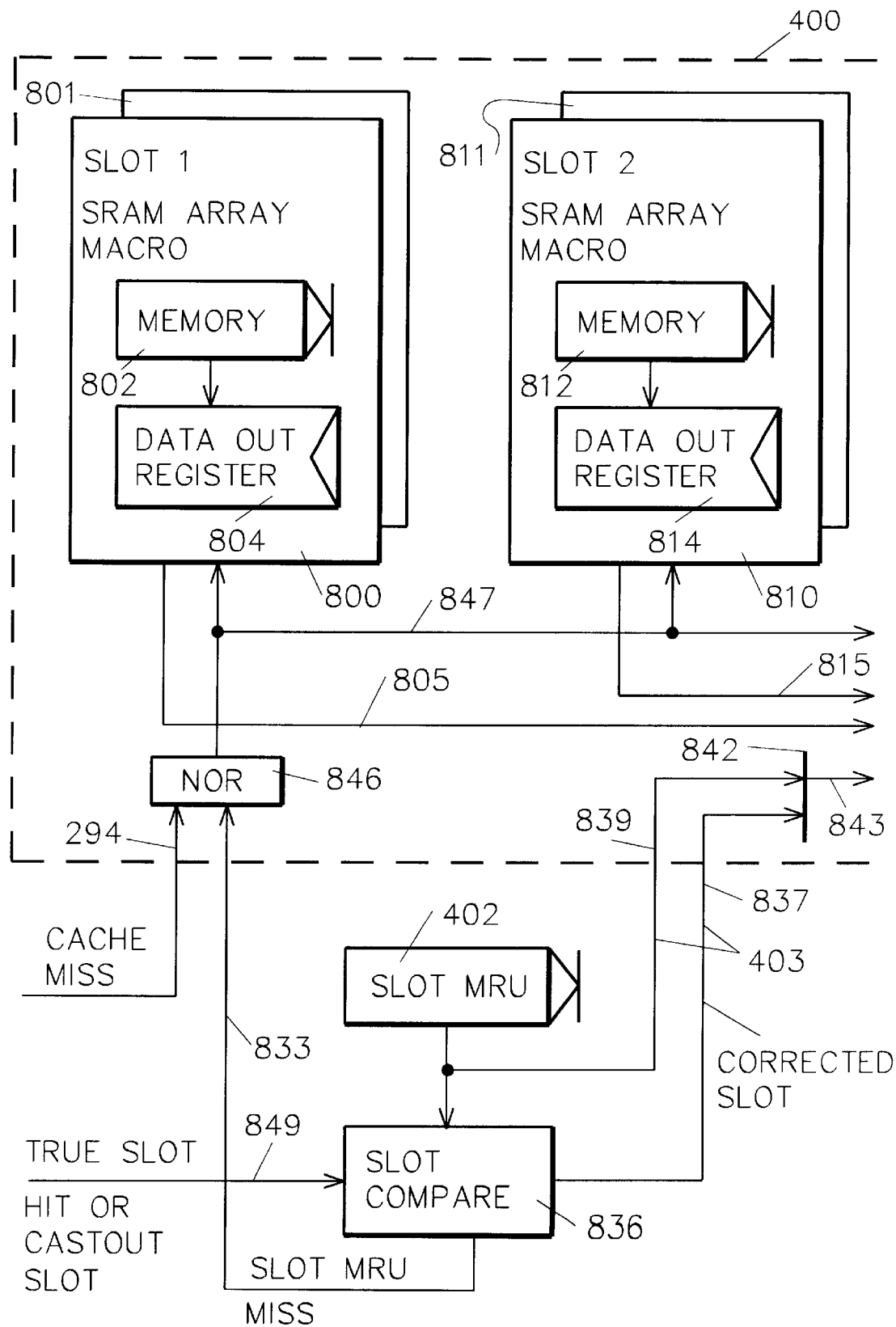
FIGS. 10A and 10B, arranged as shown in FIG. 10 are a block diagram further illustrating the cache read data path of the L1 data cache of FIG. 2C.
Figure 10B:
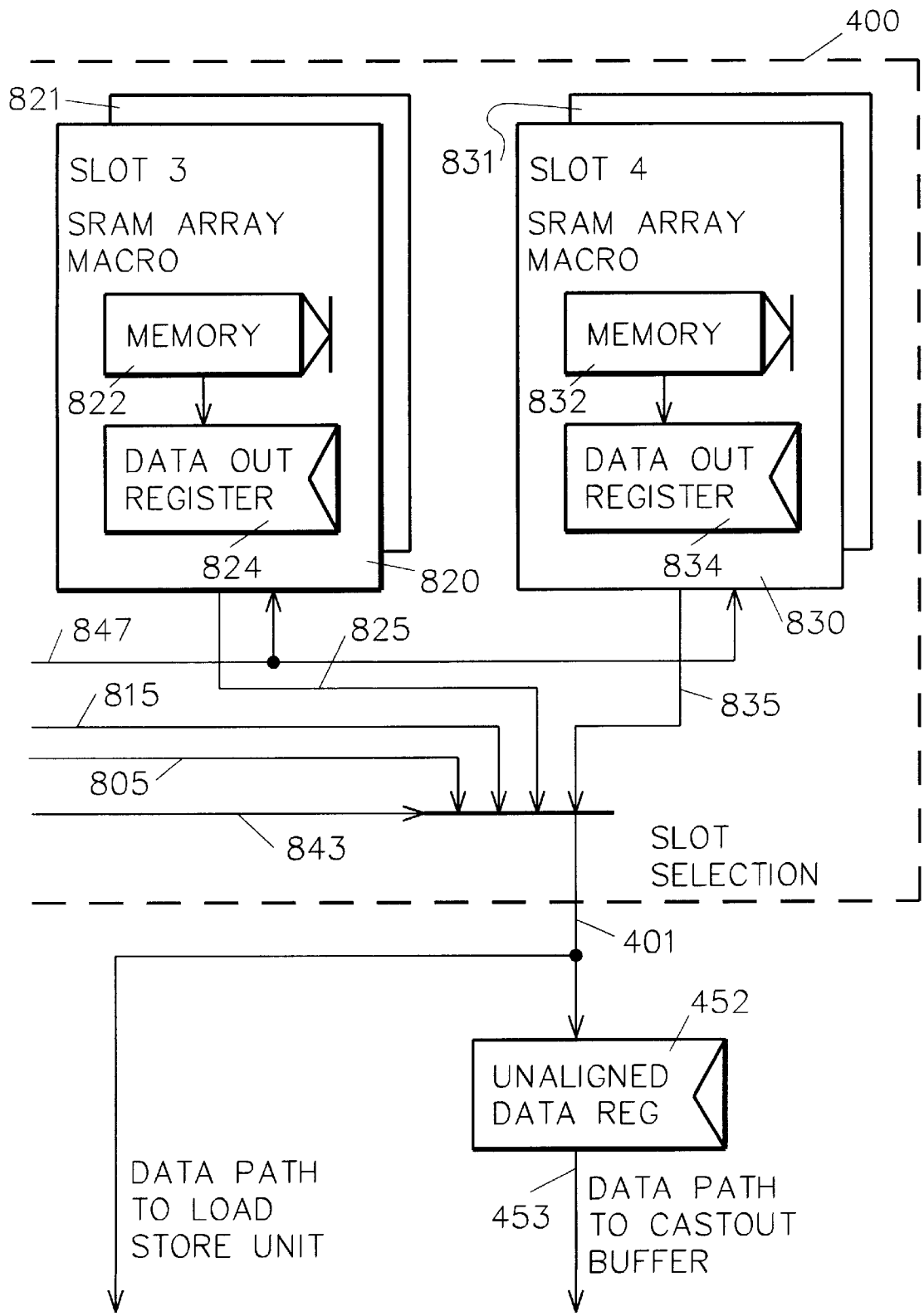

Referring to FIG. 10, a more detailed representation of microprocessor 100 data cache 400 and the associated controls for multi-cycle reading of the cache are next described. In accordance with this invention, data cache arrays 400 are implemented as on-chip custom SRAMs 800, 801, 810, 811, 820, 821, 830 and 831 to provide maximum performance. Each of SRAMs 801, 811, 821 and 831 is the second of a pair of array macros in this preferred embodiment. These SRAMs implement internal data output registers, within the SRAM macro, each of which is controllable by use of a read enable (RE) pin. It is a key aspect of the present invention to make a new use of these internal registers within the SRAM as cache array data output registers. Originally, these registers are used to hold data while write occurs to the array during the second half of a machine or CPU cycle, and to provide array isolation capabilities during certain chip test modes.

When a cache miss or wrong MRU guess occurs, the read enable is blocked late in the cache access cycle. The array requires that the read enable be turned off sometime before the leading edge of the read array clock for the next cycle in order to prevent the internal register from latching new data. The critical path from the guess-to-true comparison to the read enable pin is easier to meet than holding the read address registers. Reusing the SRAM internal data out register does not require significant additional circuitry and achieves the performance advantages of the traditional approaches without the drawbacks of either.

Referring further to FIG. 10, a diagram of that part of the cache subsystem which includes the cache read data path is shown. For clarity, the write portion of the cache is not shown, as it is not related to this cache read aspect of the invention. In accordance with this preferred embodiment of the invention, data cache 400 comprises a 4-way set associative cache with each set being a pair of physical SRAM array macros 800/801, 810/811, 820/821, 830/831. Each of these array macros comprises memory elements 802, 812, 822, 832, respectively, to hold the data bits, and a data out register 804, 814, 824, 834, respectively, used for holding the data outputs during a CPU cycle and also for testing purposes.

Data cache 400 read data path includes data register 804, 814, 824, 834 output lines 805, 815, 825 and 835, respectively, which are fed through 4:1 multiplexer 840, which selects and gates to read output data path line 401 the appropriate data register output line based on either a slot guess on line 839 from slot MRU array 402, or a corrected slot determination on line 837 from slot compare block 836. This selected data is sent to load store unit (LSU) 110 on line 401 through aligner 460 to 461, and also is sent to unaligned data register 452. The data cache read path circuitry also incorporates true slot hit line 849 and cache miss line 294, which signals if the referenced data is not in data cache 400. These signals 849 and 294 are generated by data cache control block 470 responsive to a true slot hit and cache miss, respectively. While this embodiment of the invention comprises a 4-way cache design, it is within the scope of the invention to use any n-way cache design.

In the description that follows, references to array elements 802, 812, 822, 832, data out registers 804, 814, 824 and 834, and data outputs 805, 815, 825 and 835 represent not only array macros 800, 810, 820 and 830 but also associated blocks or lines in array macros 801, 811, 821 and 831.

During a cache access cycle, all eight cache arrays 800, 801, 810, 811, 820, 821, 830 and 831 are accessed; and data is read out of the array memory elements 802, 812, 822 and 832, and latched up in SRAM data output registers 804, 814, 824, 834, respectively. These registers hold the data constant throughout the cycle. (The cache access cycle occurs in the same cycle as that of stage 320.) This is necessary due to the nature of the SRAM being a virtual 2-port design, one read and one write. The data outputs on lines 805, 815, 825, and 835 must be held because later in the cycle a write can take place and this would corrupt the data as seen from the array elements 802, 812, 822, and 832, respectively. During the same access cycle, slot MRU array 402 is accessed. This array 402 contains a guess based on the most recently used (MRU) slot in a particular congruence class. This information, which appears on line 839, is used at multiplexer 842 output line 843 to gate the data through multiplexer 840 to line 401 and through aligner 460 to line 461 and on to load store unit 110 and into unaligned data registers 452, if needed. The MRU guess on line 839 is used to gate the data through slot selection multiplexer 840 since the correct slot hit information is not available on lines 849 and 837 until late in the cache access cycle and would not have the time in the cycle to gate the correct data through slot selection multiplexer 840.

In accordance with the preferred embodiment of the invention, the problems described for the prior art are overcome, in a way which does not affect cycle time or chip area, by using the data out registers 804, 814, 824, 834 which already exist in the design of SRAMs 800, 801, 810, 811, 820, 821, 830 and 831. These registers are latches which can be controlled by input read enable (RE) line 847 external to the SRAM macro which, when active, enables new data read out of memory elements 802, 812, 822, 832 to be latched up in registers 804, 814, 824, 834, respectively, and used in the present cycle.

The virtual 2-port array macro, or SRAMs 800, 810, 820, 830, were originally designed to assure that data presented on the array outputs remain valid during the entire machine cycle even though a write operation to the array macro may be happening during the 2nd portion of the machine cycle and that the array be testable using IBM's test methodology. Accordingly, data registers 804, 814, 824 and 834 were included within the array macro to hold the read data throughout the machine cycle.

In accordance with this invention, read enable input line 847 is generated by NOR gate 846 on slot miss line 833 from slot compare block 836 and cache miss line 294, for the data read case and the copy back case respectively. If an access of cache 400 is determined to be from an incorrect slot, this signal 847 is fed to each array 800, 810, 820, 830 prior to the next read clock to cause the same data which was latched up in registers 804, 814, 824, 834, respectively, to be held for use in the following cycle. This is essentially similar to reaccessing the cache, but accomplishes the same result without an extra cycle performance hit, adds no extra latches for storing the data and does not require holding read address registers.

In the following description, Tables 2 and 3 correspond generally to FIGS. 8 and 9, where cycles N to N+2 in FIG. 8 correspond to cycle numbers 0 through 2 in Table 2, and where cycles N to N+3 in FIG. 9 correspond to cycles numbers 0 through 3 in Table 3.

By way of further explanation of the operation of the invention, referring to Table 2 and FIG. 10, two load double (ld) instructions are executed and proceed through the decode (D), execute (X) and putaway (P) stages of the processor pipeline (FIG. 2A.) The data for both ld instructions are available in data cache 400. During cycle 1 the predicted slot on lines 839 is selected by multiplexer 842 onto lines 843 which in turn select one of array macro output lines 805, 815, 825, 835 via multiplexer 840 onto lines 401. The first load experiences a slot MRU miss; that is, the slot MRU array mispredicts which cache slot (or set) contains the data of interest. A comparison occurs between the predicted slot on lines 839 and the actual slot hit on lines 849 in slot compare block 836. The detection of a miscompare activates slot MRU miss 833 which deactivates read enable 847 via NOR gate 846 to the data cache array macros 800, 801, 810, 811, 820, 821, 830, 831 late in the execute X cycle (cycle number 1.) The processor pipeline receives a hold signal late in the execute X cycle which causes it to delay completion of the putaway stage (the delay being designated by "p".) The data is available in held putaway p cycle 2 from data cache 400 due to the previously deactivated read enable 847. The corrected slot lines 837 are selected in cycle 2 by multiplexer 842 onto lines 843 which in turn select one of array macro output lines 805, 815, 825, 835 from held data out registers 804, 814, 824, 834 via multiplexer 840. Multiplexer 840 output lines 401 are sent to the load store unit 110 putaway register 330 via lines 461 in cycle 2. Load store unit 110 then completes putaway P in cycle 3 while also beginning the execute X for the second load in the same cycle. Only one delay cycle p is thus incurred due to the slot MRU miss.

Referring to Table 3, a single load double (1d) instruction is executed and proceeds through the decode D, execute X and putaway P stages of the processor pipeline (FIG. 2A.) The data for the load instruction are not available in the data cache 400 but are available in L2 cache 104. The load instruction ld experiences a data cache miss and the LRU cache line replacement algorithm chooses a modified cache line. This chosen cache line must be cast out of the data cache 400 to make room for the cache line requested by the load instruction. The processor pipeline receives a hold signal late in execute cycle 1 which remains active (illustrated in Table 1 by the four "pppp" held putaway cycles, cycles 2 through 5) until L2 cache data becomes available. The cache miss indication on line 294 is fed to the data cache array macros in order to turn off the read enable line 847 late in execute X cycle 1. The slot associated with the cache line chosen for replacement is indicated in cycle 2 on lines 849 which is transferred via selection block 836 to lines 837. Multiplexer 842 selects lines 837 onto lines 843 which in turn select one of array macro output lines 805, 815, 825, 835 from held data out registers 804, 814, 824, 834 via multiplexer 840 onto lines 401 for transferring into unaligned data register 452. Cache miss line 294 is deactivated in cycle 2, allowing read enable 847 to reactivate for use in cycle 3. Subsequent castout data transfers from the array macros occur in cycles 3–5 under control of the data cache address register (not shown in FIG. 10.) In the meantime, the L2 tag and data arrays are accessed beginning in cycle 2, with data available from the L2 cache data arrays in cycle 5. This data is then delivered to the processor in cycle 5, which releases the processor pipeline to do an execute for a subsequent possible read operation (not shown) in cycle 6. The L1 castout operation completes in cycle 5, which prevents a possible read resource conflict at the data cache arrays in cycle 6.

TABLE 1

Character Meanings

| | | |
|---|---|---|
| D | Completed DECODE cycle | |
| X | Completed EXECUTE cycle | |
| x | Held EXECUTE cycle | |
| P | Completed PUTAWAY cycle | |
| p | Held PUTAWAY cycle | |
| W | L1 cache inpage write cycle which is not also a PUTAWAY cycle | |
| 1 | Accesses associated with load instruction | |
| c | Accesses associated with data cache castout operation | |
| h | Castout data held from execute (x) cycle | |
| a | Castout data read from data cache using address register | |

TABLE 2

Data Cache: Slot MRU Miss/Load Hit Different Line

```
        0 0 1 1 2 2 3
        0...5...0...5...0...5...0
   1d   1,0(6)    DXpP
   1d   2,64(6)   DxXP
```

TABLE 3

Load Data Cache Miss with 64 Byte Castout and L2 Cache Hit

```
                  0 0 1 1 2 2 3
                  0...5...0...5...0...5...0
   1d   1,0(6)          DXppppP www
   L2 Tag                 111   ccc
   L2 Bus QW                0 123 0123
   L1 Castout Data          haaa
```

Advantages over the Prior Art

The advantages of the method of the preferred embodiments of this invention include providing a system for completing a slot MRU miss and a castout operation that avoids the need to reaccess the cache and that does not required the use of data out registers external to the array macro.

Alternative Embodiments

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

We claim:

1. A system for reading an N-way set associative cache, comprising:

each set of said cache including a virtual two-port array macro having a memory element, a data register for holding read data throughout a machine cycle, and a read enable line;

a slot miss signal line;

a cache miss signal line;

a circuit for generating a read enable signal on said read enable line as the NOR of said slot miss signal line and said cache miss signal line;

said data register being responsive to said read enable signal for registering data output during a first cycle and holding said data for use in a next following cycle.

2. A system for reading a set associative cache, comprising:

each set of said cache including a virtual two-port array macro having a memory element and a data out register for holding read data throughout a machine cycle;

cache miss means responsive to detection of a cache miss condition for generating a cache miss signal;

slot miss means responsive to detection of a slot MRU array miss condition for generating a slot MRU miss signal; and gate means responsive to the NOR of said cache miss signal and said slot MRU miss signal for holding data loaded in said data out register in a first processor cycle for access in a subsequent processor cycle.

3. The system of claim 2, further comprising a read enable input line to said data out register for selectively enabling the registering of data from said memory element to said data out register; and said gate means being responsive to the NOR of said slot MRU miss signal and said cache miss signal for inhibiting said read enable input line upon determining that an incorrect slot has been accessed in said cache.

4. A system for reading a set associative cache, comprising:

each set of said cache including a virtual two-port array macro having a memory element for holding data bits, a data out register for holding read data throughout a machine cycle, and a read enable signal input for enabling the registering of data bits from said memory element into said data out register;

a clock for generating successive machine cycles including cache array access cycles;

a slot MRU array for providing selection signals identifying for a particular congruence class a most recently used slot in said cache;

controls responsive to a first cache array access cycle for simultaneously accessing said cache and said slot MRU array;

a slot selection multiplexer initially responsive to said slot MRU array for gating data from a selected slot of said cache;

a slot comparator for generating a slot MRU miss signal responsive to detecting that selection signals provided by said slot MRU access an incorrect slot in said cache; and a gate responsive to said slot MRU miss signal during a first cache array access cycle for inhibiting said read enable signal input until a subsequent cache array access cycle.

5. The system of claim 4, including a plurality of array macros, and wherein data latched into the data output register of each array macro during a first cache array access cycle is held for selection in a subsequent cache array access cycle; thereby holding data in a correct output register for access during said subsequent cache array access cycle following the selection of an incorrect output register in said first cache array access cycle.

6. The system of claim 4, said cache array access cycles selectively including cache data read cycles and cache copy back cycles; means for detecting a cache miss and responsive thereto for generating a cache miss signal; said gate means being responsive to said slot MRU miss signal during a data read cycle and to a cache miss signal during a copy back cycle for inhibiting said read enable signal.

7. A method for reading an N-way set associative cache, each set of said cache including a virtual two-port array macro having a memory element, a data register to hold read data throughout a machine cycle, and a read enable line, comprising the steps of:

generating a read enable signal on said read enable line as the NOR of a slot miss and a cache miss; and responsive to said read enable signal, selectively registering data output during a first cache access cycle and holding said data for use in a subsequent cache access cycle.

8. A method for reading an N-way set associative cache including a plurality of slots, each slot including a virtual two-sort array macro including a corresponding data array and data output register for holding read data throughout a machine cycle, comprising the steps of:

generating successive cache access cycles;

during a first cache access cycle,
gating data from said cache data arrays into said corresponding data output registers;
predicting which slot is being accessed;
gating data from the data register of the predicted slot; and
generating a slot miss signal if the predicted slot is not correct;

responsive to said slot miss signal, inhibiting the gating of data from said cache data arrays until a subsequent cache access cycle.

9. A method for reading an N-way set associative cache including a plurality of slots, each slot including a virtual two-port array macro having a corresponding data array and data output register for holding read data throughout a machine cycle, comprising the steps of:

generating successive cache access cycles;

during a first cache access cycle,
determining if said cache contains the required data; and if not generating a cache miss signal;
selecting a slot to receive the required data;
responsive to said cache miss signal, inhibiting the gating of data from said cache data arrays until a subsequent cache access cycle;

during said subsequent cache access cycle, casting out data from the data output register of the slot selected for replacement and loading said required data into the corresponding data array.

* * * * *